United States Patent Office 3,363,884
Patented Jan. 16, 1968

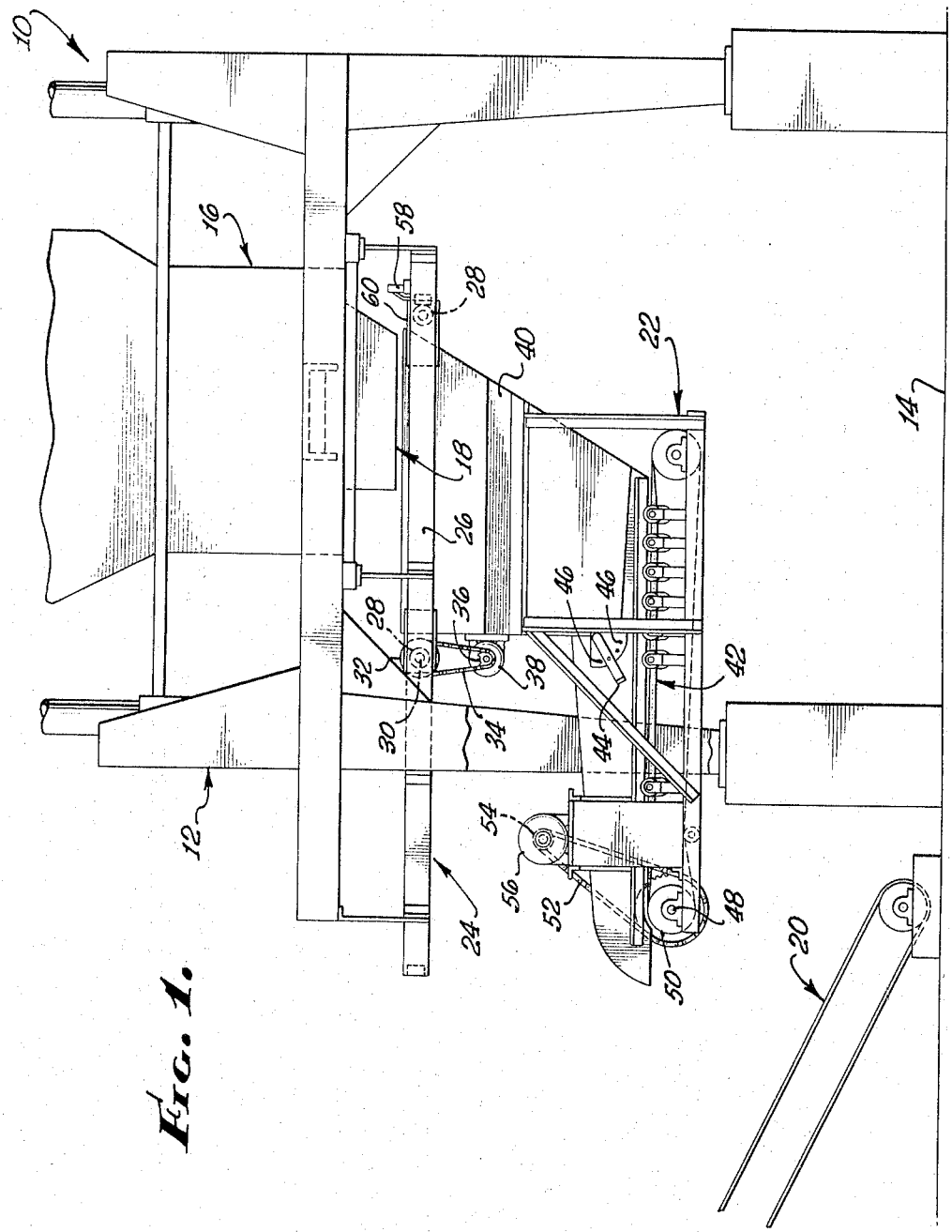

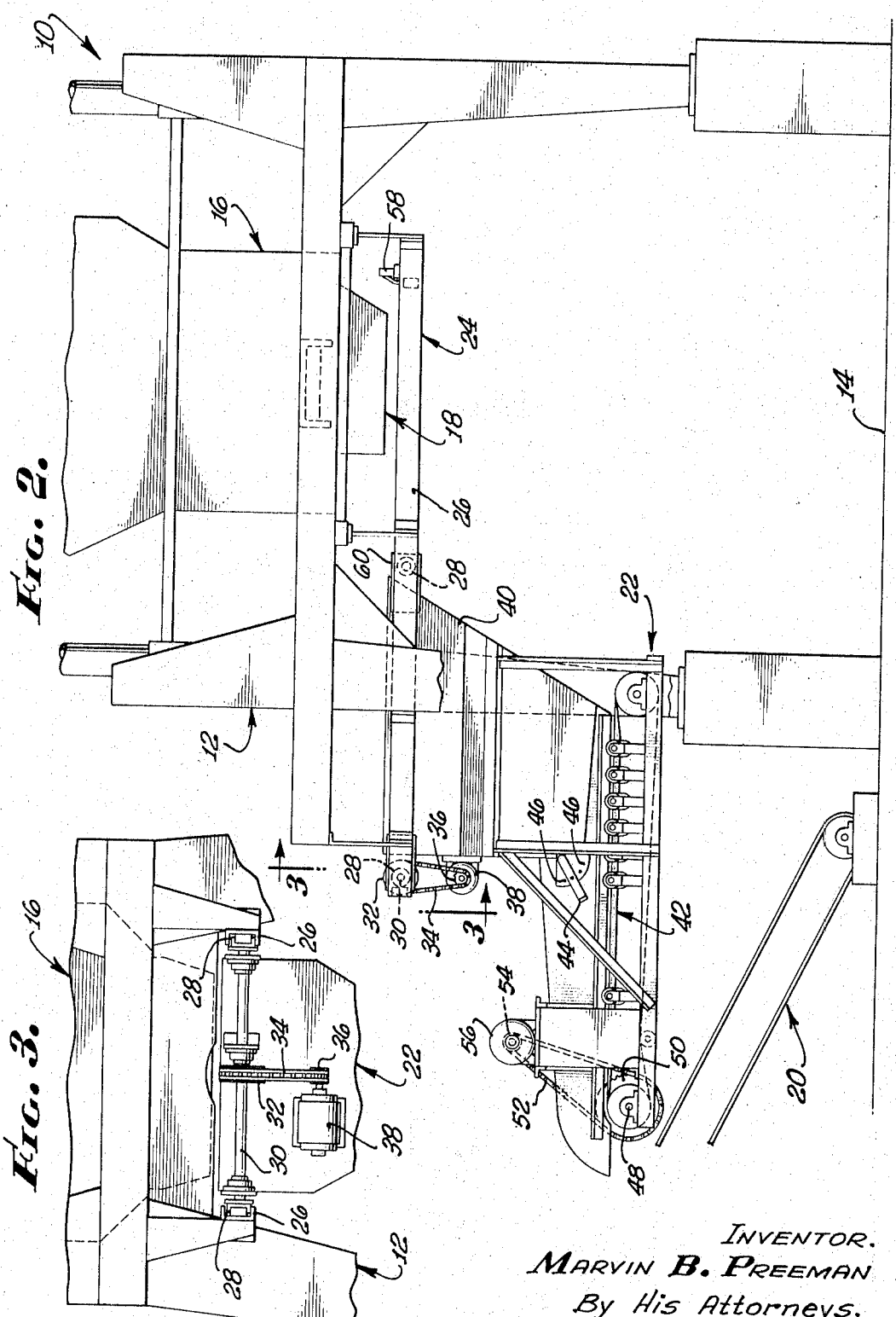

3,363,884
ASPHALT-MIX HANDLING SYSTEM
Marvin B. Freeman, Los Angeles, Calif., assignor to Standard Steel Corporation, Los Angeles, Calif., a corporation of California
Filed Jan. 12, 1967, Ser. No. 608,800
7 Claims. (Cl. 259—169)

ABSTRACT OF THE DISCLOSURE

An asphalt mixing plant and a hot-asphalt-mix storage plant having an asphalt-mix handling system which discharges the output of the plant directly into trucks when they are available, and transfers such output to the storage plant when they are not. When extra trucks are available, they are supplied from the storage plant. The asphalt-mix handling system comprises a movable conveyor unit which transfers the plant output to storage when in one position, and which permits direct discharge into trucks when in another position.

Background of the invention

The present invention relates in general to an asphalt-mix handling system and, more particularly, to an apparatus for handling the output of an asphalt mixing plant.

For maximum efficiency, an asphalt mixing plant should operate continuously with a substantially constant output. In many installations, this result is not achieved, however, because the asphalt mixing plant is required to discharge directly into trucks, or other vehicles, for transporting the asphalt mix to the site or sites where it is to be used. As a practical matter, it is impossible to schedule the trucks in such a way that one is always available to receive a load when the plant is ready to supply same. Consequently, there are times when the plant must be shut down because no trucks are immediately available. Conversely, there are times when the trucks must wait in line while the asphalt mixing plant catches up with the demand. As will be apparent, the result is inefficient over-all operation.

One solution to the foregoing problem which has been proposed is to deliver the entire output of the asphalt mixing plant to a storage plant which keeps the asphalt mix hot and dispenses it into trucks, or other vehicles, as required. Such an arrangement requires extra handling of the entire output of the asphalt mixing plant, which is undesirable.

Objects of the invention

The primary object of the present invention is to avoid the foregoing disadvantages of prior asphalt-mix handling systems by providing one in which the asphalt mixing plant discharges directly into trucks, or other vehicles, when they are available, and which transfers the asphalt mix to a storage plant when they are not. When the trucking capacity exceeds the capacity of the asphalt mixing plant, the extra trucks may be supplied from the storage plant. Thus, the asphalt mixing plant can operate continuously with a substantially constant output for maximum efficiency, and it is never necessary for trucks to stand idle, thereby increasing the over-all efficiency of the entire installation.

More specifically, an important object of the invention is to provide an asphalt-mix handling system having transfer means, movable between operative and inoperative positions, which transfers asphalt mix from the mixing plant to an asphalt-mix receiving means when the transfer means is in its operative position, and which permits the mixing plant to discharge directly into a truck, or other vehicle, when the transfer means is in its inoperative position. The asphalt-mix receiving means may, for example, comprise conveyor means for conveying the asphalt mix to a hot storage plant.

Still more specifically, an object of the invention is to provide an asphalt-mix handling system which includes: an asphalt mixing plant comprising a frame providing a driveway therethrough for trucks, or other vehicles; asphalt mixing means carried by the frame above the driveway and having discharge means for discharging asphalt mix into a truck therebelow in the driveway; asphalt-mix receiving means adjacent the driveway; and transfer means, movable between operative and inoperative positions, which receives asphalt mix from the discharge means and transfers it to the receiving means when the transfer means is in its operative position, and which is spaced horizontally from the discharge means when it is in its inoperative position to permit the discharge means to discharge asphalt mix directly into a truck in the driveway therebelow.

Another object is to provide an asphalt-mix handling system of the foregoing nature which includes horizontal track means supporting the transfer means for horizontal movement between its operative and inoperative positions. A related object is to provide means for moving the transfer means along the track means.

A further object is to provide a transfer means which includes hopper means located below the discharge means of the mixing plant when the transfer means is in its operative position, conveyor means communicating with the hopper means for transporting asphalt mix from the hopper means to the receiving means mentioned, and means for driving the conveyor means.

Still another object is to provide means for preventing actuation of the driving means for the conveyor means of the transfer means except when the transfer means is in its operative position, wherein the hopper means of the transfer means is below the discharge means of the mixing plant.

An additional object is to provide means for regulating the depth of asphalt mix on the conveyor means of the transfer means.

The foregoing objects, advantages, features and results of the present invention, together with various other objects, advantages, features and results thereof which will be evident to those skilled in the asphalt-mix handling art in the light of this disclosure, may be achieved with the exemplary embodiment of the invention described in detail hereinafter and illustrated in the accompanying drawings.

Description of the drawings

In the drawings:
FIG. 1 is a fragmentary elevational view of an asphalt-mix handling system which embodies the invention, a movable asphalt-mix transfer means of the invention being shown in its operative position;
FIG. 2 is a view which is similar to FIG. 1, but which shows the transfer means in its inoperative position; and
FIG. 3 is an enlarged, fragmentary, elevational view taken as indicated by the arrowed line 3—3 of FIG. 2.

Detailed description of the invention

In the drawings, the numeral 10 designates generally an asphalt mixing plant which may be similar to those disclosed, for example, in my Patents Nos. 2,805,052 and 3,116,051, issued Sept. 3, 1957 and Dec. 31, 1963, respectively.

As disclosed in more detail in the prior patents mentioned, the asphalt mixing plant 10 includes a frame 12 having a driveway 14 therethrough for trucks, or other vehicles. Carried by the frame 12 above the driveway 14 is an asphalt mixing means 16 having means 18 for discharging asphalt mix into a truck, not shown, in the driveway therebelow.

Adjacent and spaced laterally from the driveway 14 is an asphalt-mix receiving means 20 of any suitable nature. For convenience, the receiving means 20 is shown simply as a conveyor means for conveying asphalt mix to a suitable point of disposal, such as a storage plant, not shown, for keeping the asphalt mix hot until needed.

The asphalt-mix handling system of the invention includes movable transfer means 22 which, when in its operative position FIG. 1, transfers asphalt mix from the discharge means 18 to the receiving means 20, and which, when in its inoperative position, FIG. 2 is spaced from the discharge means to permit the discharge means to discharge asphalt mix into a truck, not shown, therebelow in the driveway 14. Thus, when a truck is available to receive asphalt mix directly from the discharge means 18, the transfer means 22 is moved to its inoperative position so that the truck may be driven into position under the discharge means 18. If no truck is available, the transfer means 22 is moved into its operative position to transfer asphalt mix from the discharge means 18 to the receiving means 20. Thus, the mixing plant 10 can operate continuously at substantially constant rate.

Considering the transfer means 22 in more detail, it is supported by a horizontal track means 24 carried by the frame 12 and extending laterally of the driveway 14 toward the receiving means 20. The track means 24 is shown as comprising spaced, parallel tracks 26, FIG. 3, which support wheels 28 on the transfer means 22.

Opposed wheels 28 are interconnected by a shaft 30 having thereon a sprocket 32 driven through a chain 34 by a sprocket 36 on the shaft of a motor 38 mounted on the transfer means 22. This structure constitutes means for moving the transfer means 22 back and forth along the track means 24 between its operative and inoperative positions.

The transfer means 22 includes a hopper or hopper means 40 which is located below the discharge means 18, in a position to receive asphalt mix therefrom, when the transfer means 22 is in its operative position, as shown in FIG. 1. When the transfer means 22 is in its inoperative position, FIG. 2, the entire transfer means is spaced laterally from the discharge means 18 a distance sufficient to permit discharging asphalt mix directly into a truck, not shown, in the driveway 14.

The transfer means 22 also includes conveyor means 42 disposed partially beneath the hopper 40 and extending laterally therefrom toward the asphalt-mix receiving means 20. The conveyor means 42, which may be of any suitable construction, transfers asphalt mix from the hopper 40 to the receiving means 20 when the transfer means 22 is in its operative position, FIG. 1.

The transfer means 22 includes a pivoted scraper means 44 above the conveyor means 42 for regulating the asphalt-mix depth on the conveyor means. This depth may be varied by pinning the scraper means 44 in any one of a plurality of holes 46.

The conveyor means 42 is provided at one end thereof with a shaft 48 which may be driven to drive the conveyor means. More particularly, the shaft 48 carries a sprocket 50 driven through a chain 52 by a sprocket 54 on the shaft of a motor 56.

Preferably, the motor 56 for driving the conveyor means 42 is prevented from operating except when the transfer means 22 is in its operative position, particularly where the structure of the asphalt-mix receiving means 20 is such that the transfer means cannot discharge thereon or thereinto when the transfer means is in its inoperative position. For this purpose, the track means 24 carries a normally-open switch 58, FIG. 1, which is engaged by and closed by a portion 60 of the transfer means 22 when the transfer means is in its operative position. In any other position, the switch 58 is open to preclude energization of the motor 56.

Although an exemplary embodiment of the invention has been disclosed herein for purposes of illustration, it will be understood that various changes, modifications and substitutions may be incorporated in such embodiment without departing from the spirit of the invention as defined by the claims which follow.

I claim as my invention:

1. In an asphalt-mix handling system, the combination of:
   (a) a frame having a driveway therethrough;
   (b) discharge means carried by said frame above said driveway for discharging asphalt mix into a vehicle therebelow in said driveway;
   (c) asphalt-mix receiving means adjacent said driveway;
   (d) movable transfer means carried by said frame, and movable relative thereto between operative and inoperative positions, for transferring asphalt mix from said discharge means to said receiving means when said transfer means is in its operative position; and
   (e) said transfer means being spaced from said discharge means when it is in its inoperative position to permit said discharge means to discharge asphalt mix into a vehicle therebelow in said driveway.

2. An asphalt-mix handling system as defined in claim 1 including horizontal track means carried by said frame and supporting said transfer means for movement between its operative and inoperative positions.

3. An asphalt-mix handling system according to claim 2 including means for moving said transfer means along said track means.

4. An asphalt-mix handling system as set forth in claim 1 wherein said transfer means includes:
   (a) hopper means located below said discharge means, in a location to receive asphalt mix from said discharge means, when said transfer means is in its operative position;
   (b) conveyor means communicating with said hopper means for transferring asphalt mix from said hopper means to said receiving means; and
   (c) means for driving said conveyor means.

5. An asphalt-mix handling system as defined in claim 4 including horizontal track means carried by said frame and supporting said transfer means for movement between its operative and inoperative positions.

6. An asphalt-mix handling system according to claim 4 including interengageable means on said frame and said transfer means for actuating said driving means only when said transfer means is in its operative position.

7. An asphalt-mix handling system as defined in claim 4 including means for regulating the asphalt-mix depth on said conveyor means.

References Cited

UNITED STATES PATENTS

| 1,341,948 | 6/1920 | Totman | 259—161 |
| 2,298,160 | 10/1942 | Pollitz | 259—153 |
| 2,805,052 | 9/1957 | Preeman | 259—159 |
| 3,116,051 | 12/1963 | Preeman | 259—153 |

ROBERT W. JENKINS, *Primary Examiner.*